United States Patent [19]

Armitage

[11] Patent Number: 4,655,554
[45] Date of Patent: Apr. 7, 1987

[54] SPATIAL LIGHT MODULATOR HAVING A CAPACITIVELY COUPLED PHOTOCONDUCTOR

[75] Inventor: David Armitage, Los Altos, Calif.

[73] Assignee: The United States of America as represented by the Secretary of the Air Force, Washington, D.C.

[21] Appl. No.: 708,926

[22] Filed: Mar. 6, 1985

[51] Int. Cl.⁴ .................... G02F 1/135; G02F 1/015; G02F 1/03
[52] U.S. Cl. .................... 350/386; 350/342; 350/356
[58] Field of Search ............ 350/356, 386, 392, 342; 365/100, 114, 120, 126

[56] References Cited

U.S. PATENT DOCUMENTS

| | | | |
|---|---|---|---|
| 3,740,734 | 6/1973 | Maldonado | 340/173 LM |
| 3,801,966 | 4/1974 | Terao | 340/173 LM |
| 3,823,998 | 7/1974 | Yazaki et al. | 350/150 |
| 3,912,391 | 10/1975 | Fleisher et al. | 355/54 |
| 3,971,931 | 7/1976 | Jehle | 350/342 |
| 4,191,452 | 3/1980 | Grinberg et al. | 350/342 |
| 4,198,647 | 4/1980 | Grinberg et al. | 350/342 |
| 4,239,348 | 12/1980 | Grinberg et al. | 350/342 |
| 4,432,071 | 2/1984 | Szabo | 365/124 |

OTHER PUBLICATIONS

Grinberg et al., "A New Real Time Non-Coherent to Coherent Light Image Converter the Hybrid Effect Liquid Crystal Light Valve", *Optical Engineering*, vol. 14, No. 3, May-Jun. 1975, pp. 217-225.
"A Fast Silicon Photoconductor-Based Liquid Crystal Light Valve", P. O. Braatz, K. Chow, U. Efron, J. Grinberg and M. J. Little, IEEE International Electron Devices Meeting, pp. 540-543, 1979.
"Oblique-cut LiN$_b$O$_3$ Microchannel Spatial Light Modulator", C. Warde and J. I. Thakara, Optics Letters, vol. 7, No. 7, Jul. 1982.
"A First-Order Model of a Photo-Activated Liquid Crystal Light Valve", J. D. Michaelson, SPIE vol. 218, Devices and Systems for Optical Signal Processing, 1980.
"LiNbO$_3$ and LiTaO$_3$ Microchannel Spatial Light Modulators", C. Warde, A. M. Weiss and A. D. Fisher, SPIE vol. 218, Devices and Systems for Optical Processing, 1980.
"Silicon Liquid Crystal Light Valves: Status and Issues", U. Efron, P. O. Braatz, M. J. Little, R. N. Schwartz and J. Grinberg, Proc. SPIE vol. 388, Jan. 1983.
"Spatial Modulation of Light in a Photosensitive Structure Composed of a Liquid Crystal and an Insulated Gallium Arsenide Crystal", I. N. Kompanets, A. V. Parfenov and Y. M. Popov, Sov. J. Quantum Electron. 9(8) Aug. 1979, pp. 1070-1071.
"Spatial Modulation of Light in Photosensitive High-Resolution Metal-Insulator-Semiconductor Structures with Liquid Crystals", A. V. Parfenov, I. N. Kompanets and Y. M. Popov, Sov. J. Quantum Electron. 10(2), Feb. 1980, pp. 167-171.

*Primary Examiner*—John K. Corbin
*Assistant Examiner*—David J. Edmondson
*Attorney, Agent, or Firm*—Richard J. Donahue; Donald J. Singer

[57] ABSTRACT

A spatial light modulator in which the photoreceptor is a capacitively coupled semiconductor in the form of a silicon-silicon dioxide-transparent electrode structure.

7 Claims, 1 Drawing Figure

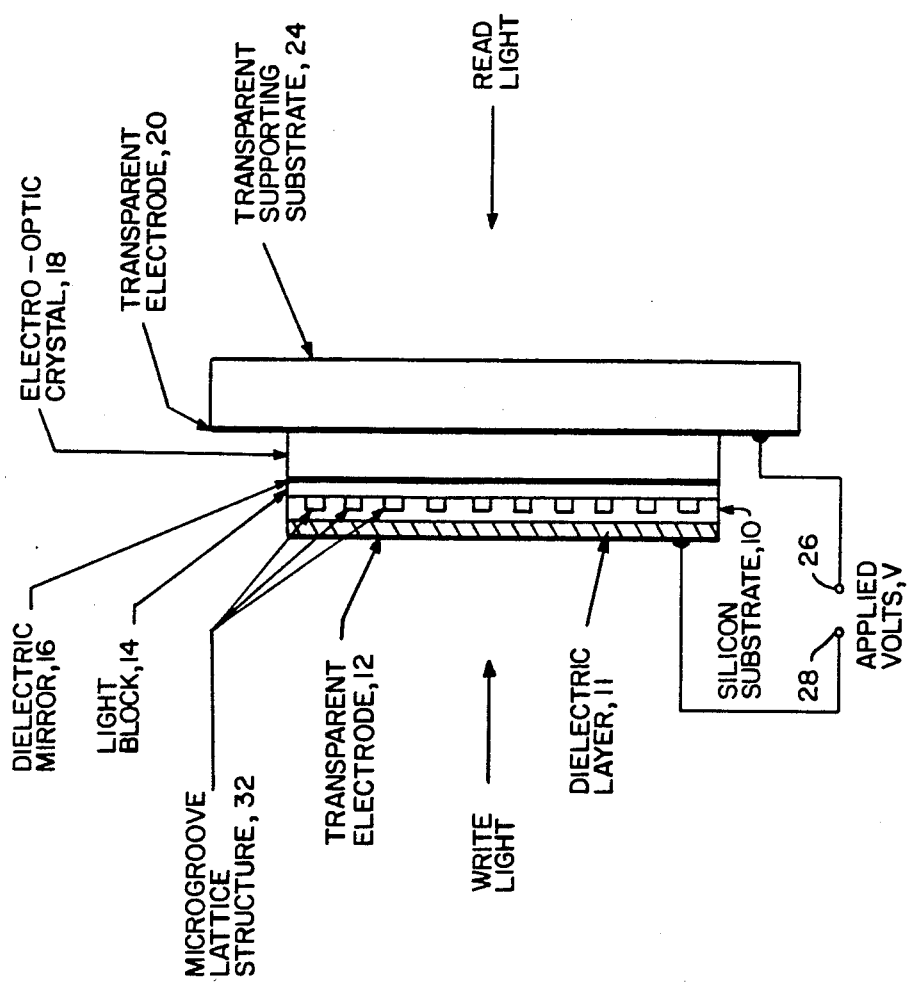

SPATIAL LIGHT MODULATOR HAVING A CAPACITIVELY COUPLED PHOTOCONDUCTOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the field of optical signal processing apparatus, and more specifically to a spatial light modulator of simplified construction and improved performance.

Two-dimensional spatial light modulators are devices which allow control of an optical wavefront for processing or imaging operations. These devices, often referred to as light valves in the literature, have potential for application in large screen display systems as well as in optical data processing systems, including missile guidance and robotic vision systems. Listed below are several articles which describe the construction and/or operation of various embodiments of spatial light modulators.

1. "A Fast Silicon Photoconductor-Based Liquid Crystal Light Valve", P. O. Braatz, K. Chow, U. Efron, J. Grinberg and M. J. Little, IEEE International Electron Devices Meeting, pp 540–543, 1979.
2. "Oblique-cut $LiN_bO_3$ Microchannel Spatial Light Modulator", C. Warde and J. I. Thakara, Optics Letters, Vol. 7, No. 7, July 1982.
3. "A First-Order Model of a Photo-Activated Liquid Crystal Light Valve", J. D. Michaelson, SPIE Vol. 218, Devices and Systems For Optical Signal Processing, 1980.
4. "$LiNbO_3$ and $LiTaO_3$ Microchannel Spatial Light Modulators", C. Warde, A. M. Weiss and A. D. Fisher, SPIE Vol. 218, Devices and Systems for Optical Signal Processing, 1980.
5. "Silicon Liquid Crystal Light Valves: Status and Issues", U. Efron, P. O. Braatz, M. J. Little, R. N. Schwartz and J. Grinberg, Proc. SPIE Vol. 388, Jan. 1983.
6. "Spatial modulation of light in a photosensitive structure composed of a liquid crystal and an insulated gallium arsenide crystal", I. N. Kompanets, A. V. Parfenov and Y. M. Popov, Sov. J. Quantum Electron. 9(8) Aug. 1979, pp 1070–1071.

One basic form of spatial light modulator comprises a photosensitive semiconductor substrate or wafer, a light blocking layer, a dielectric mirror and an electro-optic crystal (which may in some applications be a liquid crystal), arranged in a sandwich-like composite structure, and having a voltage applied thereacross. The photosensitive semiconductor substrate is often a photodiode formed by depositing p-type silicon material on the silicon substrate and applying a reverse biasing potential thereacross. A control (write) illumination impinges on the face of the photodiode while an output (read) illumination makes a double pass through the electro-optic crystal.

The photodiode responds to intensity variations in the control illumination impinging thereon. In the dark, most of the voltage applied across the composite structure appears across the reverse-biased photodiode. The write beam, however, excites carriers in the silicon, which are driven by the internal field to the Si/electro-optic crystal interface. The voltage across the silicon decreases, while the voltage across the electro-optic crystal increases. The read illumination passes through the electro-optic crystal, is reflected off of the dielectric mirror, and again passes through the electro-optic crystal before emerging from the device. Since the diffraction efficiency of the electro-optic crystal is a function of the voltage applied thereacross, (which is a function of the intensity of the write illumination), optical control of the output (read) illumination is achieved.

The fabrication of suitable photodiodes in high resistance silicon, (or other semiconductors, e.g. gallium arsenide), is a difficult art. Such photodiodes must exhibit a high voltage breakdown characteristic and have low leakage current. Leakage currents are known to occur at the semiconductor edges which adversely affect the overall performance of the spatial light modulator.

SUMMARY OF THE INVENTION

It is therefore the general object of the present invention to provide a spatial light modulator of improved construction and performance.

It is a further object of the present invention to provide a novel and cost effective means for eliminating the leakage and breakdown problems associated with photodiode elements in spatial light modulators.

Briefly, in the spatial light modulator device of the present invention, the photodiode junction is replaced by a capacitively coupled electrode. The capacitive coupling is made large compared with the capacitive load of the electro-optic crystal and the other associated series capacitances. An applied voltage pulse depletes the silicon wafer and the voltage is mainly dropped across the silicon wafer. A write light excites carriers in the silicon wafer and charge transfer raises the voltage across the electro-optic crystal in accordance with the intensity distribution in the write light image. The read light is modulated by the electro-optic response to the crystal charge. Erasure follows the end of the voltage pulse. This is generally accomplished by shorting the voltage input terminals and permitting the device to discharge to equilibrium.

BRIEF DESCRIPTION OF THE DRAWINGS

This invention together with its objects, features and advantages may be better understood from the following detailed description when read in conjunction with the drawing, in which:

FIG. 1 is a diagram of a spatial light modulator constructed in accordance with a specific embodiment of the invention.

DETAILED DESCRIPTION OF THE INVENTION

FIG. 1 is a diagram depicting the side view of the spatial light modulator of the present invention. The various components thereof have not been drawn to scale in view of the large differences in their thicknesses. Representative thickness values are provided herein to facilitate an understanding of the invention.

The spatial light modulator has a substrate 10 formed of silicon material having a thickness in the order of 100 microns. A transparent dielectric layer 11 of silicon dioxide approximately 0.3 microns thick is formed on one surface of substrate 10 and a transparent electrode 12 of gold approximately 100 angstroms thick is deposited on the dielectric layer 11. The other surface of silicon substrate 10 is adjacent a layer of light blocking material 14, having a thickness in the order of one micron. (In certain applications, light blocking layer 14 may be unnecessary.) Light blocking layer 14 is affixed to a dielectric mirror 16 and it, in turn, is affixed to an electro-optic crystal 18 having a thickness in the order of 100 microns.

The dielectric mirror 16 transmits about 0.1% of the read illumination to the silicon substrate 10. In some applications this is not critical. If it is, further isolation is provided by the inclusion of the absorbing or light blocking layer 14 having a thickness less than 10 microns to avoid degrading the resolution of the device. The conductivity of the layer must be low to avoid charge confinement leakage.

Electro-optic crystal 18 is affixed to a transparent electrode 20 having a thickness of approximately 0.25 microns and formed on one surface of a transparent supporting substrate 24 having a thickness in the order of 15 millimeters. Transparent electrode 20 provides a uniform initial electric field across electro-optic crystal 18. A first electrical terminal 26 is connected to the transparent electrode 20 and a second electrical terminal 28 is connected to the transparent electrode 12 which, as previously mentioned, is capacitively coupled to the silicon substrate 10. A voltage pulse V is applied across the terminals 26 and 28.

Optical quality and voltage requirements would suggest that electro-optic crystal 18 be formed of lithium niobate, lithium tantalate or potassium dideuterium phosphate. Electro-optic crystal 18 may also be a liquid crystal device, as proposed in several of the references listed herein. The transparent supporting substrate 24 may be formed of calcuim fluoride. Lateral charge transfer is inhibited and charge is confined to small areas on the substrate 10 by a p-n junction lattice or a microgroove lattice structure which is demarked by the reference numeral 32.

The operation of the spatial light modulator shown in FIG. 1 is the same as disclosed earlier. The control illumination, which could in some applications be the fringe pattern of an input hologram, excites electrons and holes in the silicon substrate 10. Electrons are driven by the electric field formed by the voltage pulse V to the silicon substrate 10/electro-optic crystal 18 interface. The silicon depletes; however more electrons and holes are thermally generated which results in a leakage current substantially equal to the bulk generated leakage current that would flow in a diode of the same material and geometry. The edge leakage and microplasm effects associated with a photodiode structure, however, are avoided herein. (Since the light blocking layer 14 and dielectric mirror 16 are thin and of high resistivity, they can be ignored in this analysis.) This surface charge pattern in the silicon substrate 10 gives rise to a transversely varying voltage pattern containing the same information as the charge pattern. Lateral charge transfer at the crystal 18 side of the semiconductor 10 is inhibited by a p-n junction lattice structure 32, as described in several of the references listed herein, or by a microgroove lattice structure as disclosed by applicant in his copending patent application entitled "Charge Isolation in a Spatial Light Modulator". The voltage pattern modulates the index of refraction of the electro-optic crystal 18. The index variations are sensed with the read beam which reconstructs the hologram.

The dielectric mirror 16 is necessary for the read operation and prevents the read beam from destroying the charge pattern at the surface of silicon substrate 10 by creating more charge carriers in the silicon. The light-blocking layer 14, if used, attenuates any read beam leakage through the dielectric mirror 16. The transparent electrode 20 in conjunction with the applied voltage V, provides a uniform initial field across the electro-optic crystal 18. When the read operation has been completed, the voltage V may be removed from across the terminals 26 and 28, and the input terminals shorted whereby the transversely varied charge pattern will discharge to equilibrium. The erasure duration is approximately the carrier lifetime, which is less than a millsecond in silicon.

For effective replacement of the photodiode, it is required that the capacitance of the dielectric layer 11 coupling the electrode 12 to the semiconductor 10 be large compared with the combined series capacitance of electro-optic crystal 18, dielectric mirror 16, light block 14 and any bonding layers that might be used. If the capacitance of the dielectric layer 11 is identified as $C_1$, the capacitance of the silicon wafer 10 as $C_2$, the capacitance of the dielectric mirror 16 as $C_3$, and the capacitance of the electro-optic crystal 18 as $C_4$, then the voltage $V_c$ across the crystal 18 is:

$$V_c = V \left[ \frac{\frac{1}{C_4}}{\frac{1}{C_1} + \frac{1}{C_2} + \frac{1}{C_3} + \frac{1}{C_4}} \right] \quad (1)$$

By design:
$C_1$ and $C_3 >> C_4$
Also:
$C_2 << C_4$
Then equation (1) becomes:

$$V_c = V \left[ \frac{\frac{1}{C_4}}{\frac{1}{C_2} + \frac{1}{C_4}} \right] \quad (2)$$

with no write light:

$$V_c \rightarrow V \left[ \frac{\frac{1}{C_4}}{\frac{1}{C_2}} \right] = V \frac{C_2}{C_4} \quad (3)$$

with maximum write light:
$V_c \rightarrow V$
since $C_2$ is shorted by the photocurrent.

Although the invention has been described with reference to a particular embodiment, it will be understood to those skilled in the art that the invention is capable of a variety of alternative embodiments within the spirit and scope of the appended claims. For example, other semiconductor materials may be preferred to silicon, as in applications involving infrared detection. In this application, insulating silicon dioxide could be deposited or a polymer film formed on the semiconductor material.

What is claimed is:
1. A spatial light modulator comprising:

a semiconductor element comprising a semiconductor substrate having a first surface and an opposed second surface, a first transparent metallic electrode, a dielectric layer disposed between said first surface of said semiconductor substrate and a surface of said first transparent metallic electrode, and a charge-confining microgroove lattice structure formed in said second surface of said semiconductor substrate;

a dielectric mirror having a first surface and an opposed second surface, said first surface of said dielectric mirror being adjacent said second surface of said semiconductor substrate;

an electro-optic crystal having a first surface and an opposed second surface, said first surface of said electro-optic crystal being adjacent said second surface of said dielectric mirror;

a second transparent electrode having a first surface and an opposed second surface, said first surface of said second transparent electrode being adjacent said second surface of said electro-optic crystal; and means for applying a voltage pulse between said first transparent electrode and said second transparent electrode.

2. A spatial light modulator as defined in claim 1 and further comprising:
a transparent supporting substrate adjacent said second surface of said second transparent electrode.

3. A spatial light modulator as defined in claim 1 wherein said electro-optic crystal is formed of lithium niobate material.

4. A spatial light modulator as defined in claim 1 wherein said electro-optic crystal is formed of liquid crystal material.

5. A spatial light modulator as defined in claim 1 wherein said semiconductor substrate is formed of silicon.

6. A spatial light modulator as defined in claim 5 wherein said dielectric layer is formed of silicon dioxide.

7. A spatial light modulator as defined in claim 6 wherein said silicon dioxide layer has a thickness of approximately 0.3 microns.

* * * * *